US012198700B2

(12) United States Patent
Karia et al.

(10) Patent No.: US 12,198,700 B2
(45) Date of Patent: Jan. 14, 2025

(54) MEDIA SYSTEM WITH CLOSED-CAPTIONING DATA AND/OR SUBTITLE DATA GENERATION FEATURES

(71) Applicant: Roku, Inc., San Jose, CA (US)

(72) Inventors: Snehal Karia, Fremont, CA (US); Greg Garner, San Jose, CA (US); Sunil Ramesh, Cupertino, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/328,358

(22) Filed: Jun. 2, 2023

(65) Prior Publication Data

US 2024/0404525 A1     Dec. 5, 2024

(51) Int. Cl.
| | |
|---|---|
| *G10L 15/26* | (2006.01) |
| *G10L 15/25* | (2013.01) |
| *G10L 25/57* | (2013.01) |
| *G10L 25/78* | (2013.01) |
| *H04N 21/488* | (2011.01) |

(52) U.S. Cl.
CPC .............. *G10L 15/26* (2013.01); *G10L 15/25* (2013.01); *G10L 25/57* (2013.01); *G10L 25/78* (2013.01); *H04N 21/4884* (2013.01)

(58) Field of Classification Search
CPC ......... G10L 15/26; G10L 25/57; G10L 25/78; G10L 15/25; H04N 21/4884
See application file for complete search history.

(56) References Cited

U.S. PATENT DOCUMENTS

| | | | |
|---|---|---|---|
| 8,924,210 B2 | 12/2014 | Basson | |
| 9,418,152 B2 | 8/2016 | Nissan | |
| 2005/0267894 A1* | 12/2005 | Camahan | ............... G06F 16/48 |
| 2007/0011012 A1* | 1/2007 | Yurick | .................... G10L 15/26 |
| | | | 704/277 |
| 2008/0002291 A1 | 1/2008 | Balamane | |
| 2020/0084521 A1 | 3/2020 | Adler | |
| 2023/0252980 A1* | 8/2023 | Kumar | ............... G10L 15/1815 |
| | | | 704/257 |

* cited by examiner

*Primary Examiner* — Angela A Armstrong
(74) *Attorney, Agent, or Firm* — McDonnell Boehnen Hulbert & Berghoff LLP (57) ABSTRACT

In one aspect, an example method includes (i) obtaining media, wherein the obtained media includes (a) audio representing speech and (b) video; (ii) using at least the audio representing speech as a basis to generate speech text; (iii) using at least the audio representing speech to determine starting and ending time points of the speech; and (iv) using at least the generated speech text and the determined starting and ending time points of the speech to (a) generate closed-captioning or subtitle data that includes closed-captioning or subtitle text based on the generated speech text and (b) associating the generated closed-captioning or subtitle data with the obtained media, such that the closed-captioning or subtitle text is time-aligned with the video based on the determined starting and ending time points of the speech.

17 Claims, 6 Drawing Sheets

MEDIA SYSTEM WITH CLOSED-CAPTIONING DATA AND/OR SUBTITLE DATA GENERATION FEATURES

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) obtaining media, wherein the obtained media includes (a) audio representing speech and (b) video; (ii) using at least the audio representing speech as a basis to generate speech text; (iii) using at least the audio representing speech to determine starting and ending time points of the speech; and (iv) using at least the generated speech text and the determined starting and ending time points of the speech to (a) generate closed-captioning or subtitle data that includes closed-captioning or subtitle text based on the generated speech text and (b) associating the generated closed-captioning or subtitle data with the obtained media, such that the closed-captioning or subtitle text is time-aligned with the video based on the determined starting and ending time points of the speech.

In another aspect, an example computing system is disclosed. The computing system includes a processor and a non-transitory computer-readable storage medium having stored thereon program instructions that upon execution by the processor, cause the computing system to perform a set of acts including (i) obtaining media, wherein the obtained media includes (a) audio representing speech and (b) video; (ii) using at least the audio representing speech as a basis to generate speech text; (iii) using at least the audio representing speech to determine starting and ending time points of the speech; and (iv) using at least the generated speech text and the determined starting and ending time points of the speech to (a) generate closed-captioning or subtitle data that includes closed-captioning or subtitle text based on the generated speech text and (b) associating the generated closed-captioning or subtitle data with the obtained media, such that the closed-captioning or subtitle text is time-aligned with the video based on the determined starting and ending time points of the speech.

In another aspect, an example non-transitory computer-readable medium is disclosed. The computer-readable medium has stored thereon program instructions that upon execution by a processor, cause a computing system to perform a set of acts including (i) obtaining media, wherein the obtained media includes (a) audio representing speech and (b) video; (ii) using at least the audio representing speech as a basis to generate speech text; (iii) using at least the audio representing speech to determine starting and ending time points of the speech; and (iv) using at least the generated speech text and the determined starting and ending time points of the speech to (a) generate closed-captioning or subtitle data that includes closed-captioning or subtitle text based on the generated speech text and (b) associating the generated closed-captioning or subtitle data with the obtained media, such that the closed-captioning or subtitle text is time-aligned with the video based on the determined starting and ending time points of the speech.

DETAILED DESCRIPTION

I. Overview

When closed-captioning is enabled on a device such as a media-presentation device, video and corresponding closed-captioning text (or other content) is displayed (e.g., as an overlay on top of the video) as the media-presentation device presents the video. The closed-captioning text can represent or refer to, for example, speech, sound effects, or other portions of the audio component that corresponds to the video, thereby helping a user of the media-presentation device to comprehend what is being presented. Generally, subtitles are a similar concept, except that they are not primarily intended for the hearing impaired. Rather, subtitles are generally intended to transcribe speech into a preferred language of the user.

Closed-captioning and subtitle data can be generated in various ways. For example, an individual listening to audio can manually type out corresponding text. However, this may be a tedious and time-consuming process.

The disclosed systems and methods provide an alternative and improved approach. In one aspect, this involves a media manager (i) obtaining media, wherein the obtained media includes (a) audio representing speech and (b) video; (ii) using at least the audio representing speech as a basis to generate speech text; (iii) using at least the audio representing speech to determine starting and ending time points of the speech; and (iv) using at least the generated speech text and the determined starting and ending time points of the speech to (a) generate closed-captioning or subtitle data that includes closed-captioning or subtitle text based on the generated speech text and (b) associating the generated closed-captioning or subtitle data with the obtained media, such that the closed-captioning or subtitle text is time-aligned with the video based on the determined starting and ending time points of the speech. These and other operations, such as operations related to techniques for editing existing closed-captioning data and techniques for configuring how closed-captioning text is output for presentation, are described in detail below.

II. Example Architecture

A. Media System

Figure 1:
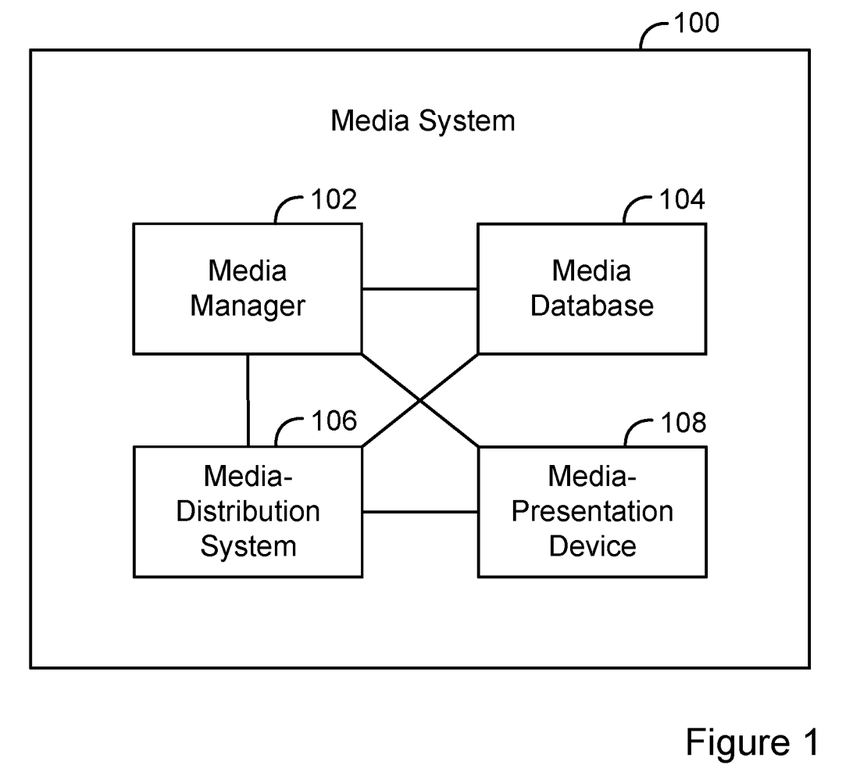
FIG. 1 is a simplified block diagram of an example media system in which various described principles can be implemented.

FIG. 1 is a simplified block diagram of an example media system 100. Generally, the media system 100 can perform operations related to media. Media can include a video component and/or an audio component. For context, there can be various examples of media. For instance, media can be or include a media program such as a movie or a television show, an advertisement, or a portion or combination thereof, among numerous other possibilities.

In some instances, media can be made up one or more segments. For example, in the case where the media is a media program, the media program can be made up of multiple segments, each representing a scene of the media program. In various other examples, a segment can be a smaller or larger portion of the media. In some cases, a media program can include one or more advertisements embedded therein. In such cases, each advertisement may be considered its own segment, perhaps among other segments of the media program.

Media can be represented by media data, which can be generated, stored, and/or organized in various ways and according to various formats and/or protocols, using any related techniques now know or later discovered. For example, the media can be generated by using a camera, a microphone, and/or other equipment to capture or record a live-action event. In other examples, the media can be synthetically generated, such as by using any related media generation techniques now know or later discovered.

As noted above, media data can also be stored and/or organized in various ways. For example, the media data can be stored and organized as a Multimedia Database Management System (MDMS) and/or in various digital file formats, such as the MPEG-4 format, among numerous other possibilities.

The media data can represent the media by specifying various properties of the media, such as video properties (e.g., luminance, brightness, and/or chrominance values), audio properties, and/or derivatives thereof. In some instances, the media data can be used to generate the represented media. But in other instances, the media data can be a fingerprint or signature of the media, which represents the media and/or certain characteristics of the media and which can be used for various purposes (e.g., to identify the media or characteristics thereof), but which is not sufficient at least on its own to generate the represented media.

In some instances, media can include metadata associated with the video and/or audio component. In the case where the media includes video and audio, the audio may generally be intended to be presented in sync together with the video. To help facilitate this, the media data can include metadata that associates portions of the video with corresponding portions of the audio. For example, the metadata can associate a given frame or frames of video with a corresponding portion of audio. In some cases, audio can be organized into one or more different channels or tracks, each of which can be selectively turned on or off, or otherwise controlled. Video data can also include other types of metadata associated with the video content. For example, the video data (and/or its audio data component) can include closed-captioning data.

Returning back to the media system 100, this can include various components, such as a media manager 102, a media database 104, a media-distribution system 106, and/or a media-presentation device 108.

Each of these components can take various forms. For example, the media-presentation device 108 can take the form of a television, a sound speaker, a streaming media player, and/or a set-top box, among numerous other possibilities. In practice, one or more of these can be integrated with another. For instance, in one example, a media-presentation device 108 can take the form of a television with an integrated sound speaker component and an integrated streaming media player component.

Figure 2:
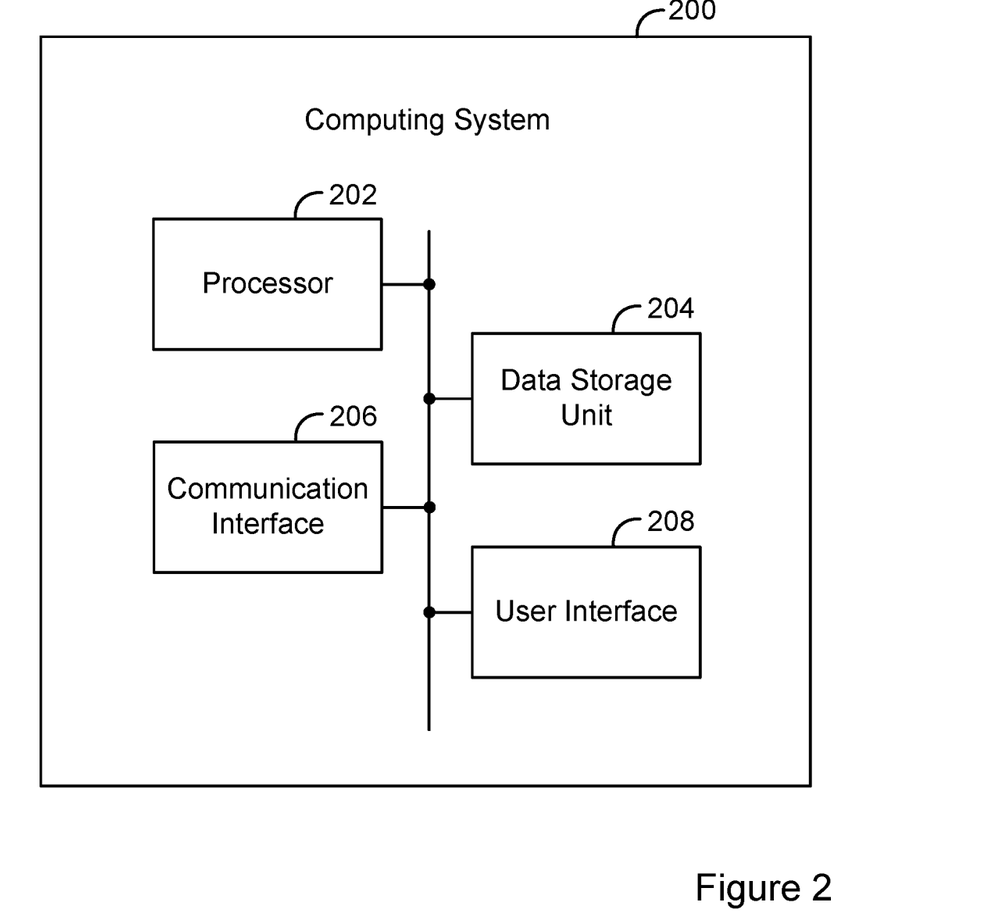
FIG. 2 is a simplified block diagram of an example computing system in which various described principles can be implemented.

The media-presentation device 108 can also include one or more connection mechanisms that connect various components within the media-presentation device 108. For example, the media-presentation device 108 can include the connection mechanisms represented by lines connecting components of the media-presentation device 108, as shown in FIG. 2.

Returning back to the media system 100, the media system 100 can also include one or more connection mechanisms that connect various components within the media system 100. For example, the media system 100 can include the connection mechanisms represented by lines connecting components of the media system 100, as shown in FIG. 1.

In this disclosure, the term "connection mechanism" means a mechanism that connects and facilitates communication between two or more devices, systems, other entities, and/or components thereof. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

Generally, the media manager 102 can obtain media from the media database 104, and can transmit the obtained media to the media-distribution system 106, which in turn can transmit the media to the media-presentation device 108, such that the media-presentation device 108 can output the media for presentation to an end-user.

The media manager 102 can obtain media in various ways, such as by selecting media based on user input and retrieving it from the media database 104. In some examples, the media-presentation device 108 can receive such input from a user via a user interface, and can then transmit the input to the media manager 102, such that the media manager 102 can use the input to make the selection.

The media manager 102 can then transmit the media to the media-distribution system 106, which in turn can transmit the media to the media-presentation device 108. The media-distribution system 106 can transmit the media to the media-presentation device 108 in various ways. For example, the media-distribution system 106 can transmit the media on one or more channels (sometimes referred to as stations or feeds). As such, the media-distribution system 106 can be associated with a single channel media distributor or a multi-channel media distributor such as a multi-channel video program distributor (MVPD).

The media-distribution system 106 and its means of transmission of media on the channel to the media-presentation device 108 can take various forms. By way of example, the media-distribution system 106 can be or include a cable-television head-end that is associated with a cable-television provider and that transmits the media on the channel to the media-presentation device 108 through hybrid fiber/coaxial cable connections. As another example, the media-distribution system 106 can be or include a satellite-television head-end that is associated with a satellite-television provider and that transmits the media on the channel to the media-presentation device 108 through a satellite transmission. As yet another example, the media-distribution system 106 can be or include a television-broadcast station that is associated with a television-broadcast provider and that transmits the media on the channel through a terrestrial over-the-air interface to the media-presentation device 108. And as yet another example, the media-distribution system 106 can be an Internet-based distribution system that transmits the media using a media streaming-characteristic service or the like to the media-presentation device 108. In these and other examples, the media-distribution system 106 can transmit the media in the form of an analog or digital broadcast stream representing the media.

The media-presentation device 108 can then receive the media from the media-distribution system 106. In one example, the media-presentation device 108 can select (e.g., by tuning to) a channel from among multiple available channels, perhaps based on input received via a user interface, such that the media-presentation device 108 can receive media on the selected channel.

After the media-presentation device 108 receives the media from the media-distribution system 106, the media-presentation device 108 can output the media for presentation. The media-presentation device 108 can output media for presentation in various ways. For example, in the case where the media-presentation device 108 is a television, outputting the media for presentation can involve the television outputting the media via a user interface (e.g., a display screen and/or a sound speaker), such that it can be presented to an end-user. As another example, in the case where the media-presentation device 108 is a media streaming player, outputting the media for presentation can involve the media streaming player outputting the media via a communication interface (e.g., an HDMI interface), such that it can be received by a television and in turn output by the television for presentation to an end-user.

In some instances, the media system 100 and/or components thereof can include multiple instances of at least some of the described components. The media system 100 and/or components thereof can take the form of a computing system, an example of which is described below.

B. Computing System

FIG. 2 is a simplified block diagram of an example computing system 200. The computing system 200 can be configured to perform and/or can perform various operations, such as the operations described in this disclosure. The computing system 200 can include various components, such as a processor 202, a data storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data storage unit 204 as described below.

The data storage unit 204 can be or include one or more volatile, non-volatile, removable, and/or non-removable storage components, such as magnetic, optical, and/or flash storage, and/or can be integrated in whole or in part with the processor 202. Further, the data storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, such as a partially or fully cloud-based arrangement, for instance.

As noted above, the media system 100 and/or components of the media system 100 can take the form of a computing system, such as the computing system 200. In some cases, some or all of these entities can take the form of a more specific type of computing system, such as a desktop or workstation computer, a laptop, a tablet, a mobile phone, a television, a set-top box, a streaming media player, a head-mountable display device (e.g., virtual-reality headset or an augmented-reality headset), and/or a wearable device (e.g., a smart watch), among numerous other possibilities.

Although some example architecture has been provided above, the above-described components, systems, and/or other entities can be configured in various other ways as well. For example, the above-described components, systems, and/or other entities can be combined and/or split into different components, systems, and/or other entities, for instance.

III. Example Operations

The media system 100, the computing system 200, and/or components of either can be configured to perform and/or can perform various operations, such as operations related to closed-captioning-based and/or subtitle-based features.

For context, closed-captioning is a service that was developed for the hearing impaired. When closed-captioning is enabled on a device such as the media-presentation device 108, video and corresponding closed-captioning text (or other content) is displayed (e.g., as an overlay on top of the video) as the media-presentation device 108 presents the video. The closed-captioning text can represent or refer to, for example, speech, sound effects, or other portions of the audio component that corresponds to the video, thereby helping a user of the media-presentation device 108 to comprehend what is being presented. Closed-captioning can also be disabled on the media-presentation device 108 such that the video can be displayed without the closed-captioning text.

Closed-captioning data can be generated in various ways. For example, an individual listening to audio can manually type out corresponding text. Closed-captioning data can also be generated in an automated or partially automated way, such as using the techniques disclosed herein. After the closed-captioning text is generated, it can be encoded and stored in the form of closed-captioning data, which can then be embedded in or otherwise associated with corresponding video and/or audio. The closed-captioning data can associate portions of the closed-captioning text with corresponding portions of the video and/or audio. For example, the metadata can associate a given portion of text with one or more corresponding frames and/or with a corresponding portion of audio, which can allow the closed-captioning text to be time aligned (i.e., in sync with the video and/or audio). As such, the media-presentation device 108 can then extract the closed-captioning data and display the closed-captioning text (or other content) as it presents the video (and audio).

Generally, subtitles are a similar concept, except that they are not primarily intended for the hearing impaired. Rather, subtitles are generally intended to transcribe speech into a preferred language of the user. For example, in the case where a movie includes mostly English-language speech, except for a scene that includes French-language speech instead, subtitles might be used to provide an English-language transcription of that French-language speech in that scene, so that a listener who understands English, but not French, can comprehend what is being said. In another example, in the case where a movie includes all English-language speech, but where the listener understands Spanish, but not English, subtitles might be used to provide a Spanish-language transcription of the English-language speech, so that a user who understands Spanish, but not English, can comprehend what is being said.

Notably though, in some cases, subtitles can also be used to provide a transcription in the same language as the speech language. In some situations, users may use subtitles even when there is no need for a translation (e.g., to make is easier to engage with the media in a noisy environments) and thus they may get a benefit similar to that which is provided with closed-captioning). Notably though, since subtitles are not primarily intended for the hearing impaired, subtitles cover speech, but not sound effects or other types of audio.

Like closed-captioning data, subtitle data can be generated in various ways. For example, an individual listening to audio can manually type out corresponding text. Subtitle data can also be generated in an automated or partially automated way, such as using the techniques disclosed herein. Unlike closed-captioning data, subtitle data is generally not associated with the media as metadata. Rather, the subtitle data is associated with the media by way of modifying the media to include the subtitle text as an overlay on the video component of the media.

With this context, several closed-captioning-based and subtitle-based features and related operations will now be described.

A. Generating Closed-Captioning Data and/or Subtitle Data and Associating the Data with Media As noted above, closed-captioning data can be generated in various ways. For example, an individual listening to audio can manually type out corresponding text. However, closed-captioning data can also be generated in an automated or partially automated way, such as by using one or more of the techniques described below.

To begin, the media manager 102 can obtain media. In one example, this can involve the media manager 102 selecting media based on input received from a user via a user interface. In another example, this can involve the media manager 102 automatically selecting media based on one or more predefined rules, and then obtaining the selected media. The media manager 102 can then obtain the selected media in various ways, such as by retrieving from a media database, such as the media database 104, media data representing the selected media. The media can include various components, such as audio and video, either of which can include its own subcomponents. For example, the audio can include audio representing speech and audio representing sound effects.

The media manager 102 can use at least the audio representing speech as a basis to generate speech text. To be able to use the audio representing speech for this purpose, the media manager 102 can first extract the audio representing speech.

In some instances, the audio representing speech can be a separate audio track within the audio component, or it can be a portion of the audio component that is tagged such that the audio representing speech can be isolated from any remaining audio included in the media. In other examples, the media manager 102 can isolate and/or extract the audio representing speech from other audio by employing any speech isolation and/or extraction technique now known or later discovered. Example techniques include those describe in US Pat. App. Pub. No. 2020/0084521 entitled "Automatic personal identifiable information removal from audio" and KR Pat. App. Pub. No. 20080002291 entitled "Voice deleting device and method from original sound." The extracted audio can be stored in various ways (e.g., as audio data representing the audio, stored in an audio file format), as with any audio.

As noted above, the media manager 102 can use at least the audio representing speech as a basis to generate speech text. The media manager 102 can do this in various ways. For example, the media manager 102 can do this by employing a machine learning technique, such as one that uses a deep neural network (DNN) to train a model to use a runtime input-data set that includes audio representing speech to generate a runtime output-data set that includes the corresponding speech text.

Notably though, before the media manager 102 uses a model to analyze a runtime input-data set to generate a runtime output-data set, the media manager 102 can first train the model by providing it with training input-data sets and training output-data sets. Each of the training input-data sets can include audio representing speech and each of the training output-data sets can include corresponding speech text.

As with all models disclosed herein, in practice, it is likely that large amounts of training data-perhaps thousands of training data sets or more-would be used to train the model as this generally helps improve the usefulness of the model. Training data can be generated in various ways, including by being manually assembled. However, in some cases, the one or more tools or techniques, including any training data gathering or organization techniques now known or later discovered, can be used to help automate or at least partially automate the process of assembling training data and/or training the model.

After the model is trained, the media manager 102 can then provide to the model runtime input data, which the model can use to generate runtime output data. Generally, the runtime input data is of the same type as the training input data as described above. As such, in one example, the media manager 102 using at least the audio representing speech as the basis to generate the speech text can involve:

(i) providing to a trained model, at least audio data for the audio representing speech; and (ii) responsive to the providing, receiving from the trained model, generated speech text generated by the trained model.

In some cases, the model can be configured to generate speech text in the same language of the speech represented by the audio. But in other examples, the model can use a different (e.g., user selected) language for the purpose of generating the speech text.

Example models that can be used for this purpose include speech-to-text (STT) models. Example techniques for using a STT module in this manner include those described in U.S. Pat. No. 9,418,152 entitled "System and method for flexible speech to text search mechanism," US Pat. App. Pub. No. 2020/0084521 entitled "Automatic personal identifiable information removal from audio," and U.S. Pat. No. 8,924, 210 entitled "Text processing using natural language understanding." But other models can be used as well.

The media manager 102 can store the generated speech text in various ways, such as by storing representative text data as a text file in a database, for instance. In this way, the media manager 102 can have access to text representing the speech of the media. For example, in the case where the media is an action movie, the media manager 102 can have access to a text-based transcription of at least a portion of the dialog of that movie.

In some examples, in addition to the audio representing speech, the media manager 102 can also use other information in connection with generating the speech text. For example, the media manager 102 can use metadata associated with the obtained media for this purpose. In one example, the media manager 102 can use the metadata for this purpose by providing it as an additional input into the model. By leveraging this additional input, this may help the model more accurately generate speech.

Indeed, consider a situation in which the model may have trouble identifying a word of speech because the word may sound like two or more similar sounding words. By considering metadata, such as a plot description or a rating, this can help the model select the word that is more likely to be correct in view of that additional data point. Indeed, in the case of the plot description, this could help the model select the word that is more semantically in line with plot description, for instance. In the case of the rating, this could help the model select the word that is more in line with the rating, for instance. For example, in the case where the rating is a rating or "G" (meaning "general audience"), the model may select the word that is more general audience friendly (as opposed to a word that may be associated with a rating of "R" (meaning "restricted"), for instance). Various other types of metadata that might help inform that correct speech can also be used in this context.

As such, in some examples, the media manager 102 using at least the audio representing speech as the basis to generate the speech text can involve using at least (i) the audio representing speech and (ii) metadata associated with the obtained media, as the basis to generate the speech text.

In other examples, in addition to the audio representing speech, the media manager 102 can use mouth movement depictions of the video component of the video in connection with generating the speech text. Similar to with the metadata example above, the media manager 102 can use mouth movement depictions for this purpose by providing it as an additional input into the model. By leveraging this additional input, this may help the model more accurately generate speech. Indeed, consider again a situation in which the model may have trouble identifying a word within a given portion of speech because the speech may sound like two more similar sounding words. By considering corresponding mouth movement depictions, this can help the model select the word that is more likely to be correct in view of that additional data point. In practice, this could mean providing as an additional input to the model, video data that depicts the mouth movements, or mouth movement depiction data (e.g., in the form of a mouth movement feature vector or the like) derived from the video.

As such, in some examples, the media manager 102 using at least the audio representing speech as the basis to generate the speech text can involve using at least (i) the audio representing speech and (ii) mouth movement depictions of the video, as the basis to generate the speech text.

Depending on which types of input are provided to the model, different models may be used. For example, in the case where the model is receiving mouth movement depictions of video and speech representing audio as inputs, it may be desirable to employ any audio/visual automated speech recognition model or the like now known or later discovered, to generate the speech text.

In some cases, it may be desirable to determine which character in the media is speaking which portion of speech. To help with this, in some examples, one or more of the above-described models may output not only the speech text, but also an indication of the speaker corresponding to the speech text. Various techniques can be used to help identify the speaker. For example, any of the above-described models can be configured to use voice signature identification to identify the speaker. Additionally or alternatively, the models can be configured to recognize which character in the scene has mouth movements that correspond to the speech, and as such, the models can identify the speaker on that basis.

Next, the media manager 102 can use at least the audio representing speech to determine starting and ending time points of the speech. The media manager 102 can do this in various ways. For example, the media manager 102 can do this by employing a machine learning technique, such as one that uses a DNN to train a model to use a runtime input-data set that includes the audio representing speech to generate a runtime output-data set that includes the corresponding starting and ending time points of speech.

Notably though, before the media manager 102 uses a model to analyze a runtime input-data set to generate a runtime output-data set, the media manager 102 can first train the model by providing it with training input-data sets and training output-data sets. Each of the training input-data sets can include the audio representing speech and each of the training output-data sets can include corresponding starting and ending time points of speech.

After the model is trained, the media manager 102 can then provide to the model runtime input data, which the model can use to generate runtime output data. Generally, the runtime input data is of the same type as the training input data as described above. As such, in one example, the media manager 102 using at least the audio representing speech to determine starting and ending time points of the speech can involve: (i) providing to a trained model, at least audio data for the audio representing speech; and (ii) responsive to the providing, receiving from the trained model, starting and ending time points determined by the trained model.

The starting time point and/or an ending time point can be represented in various ways, such as an offset from a reference point such as the start of the media (e.g., in hours::minutes::seconds::frames format), among other possibilities. As such, in one example, the starting time point and/or the ending time point may take the form of a frame marker/identifier (for the frame that corresponds to the portion of the audio that is the starting time point or ending time point of the speech).

In some examples, the media manager 102 can use the audio representing speech as a basis to generate speech text and as a basis to determine starting and ending time points of the speech, at or around the same time. For instance, the media manager 102 can do this by using a single model to both generate the text and to determine the starting and ending time points of the speech. As such, the media manager 102 can train a model to use a runtime input-data set that includes the audio representing speech to generate a runtime output-data set that includes the corresponding audio speech and also the corresponding starting and ending time points of speech.

Notably though, before the media manager 102 uses a model to analyze a runtime input-data set to generate a runtime output-data set, the media manager 102 can first train the model by providing it with training input-data sets and training output-data sets. Each of the training input-data sets can include the audio representing speech and each of the training output-data sets can include corresponding speech audio and the corresponding starting and ending time points of speech.

Figure 3:
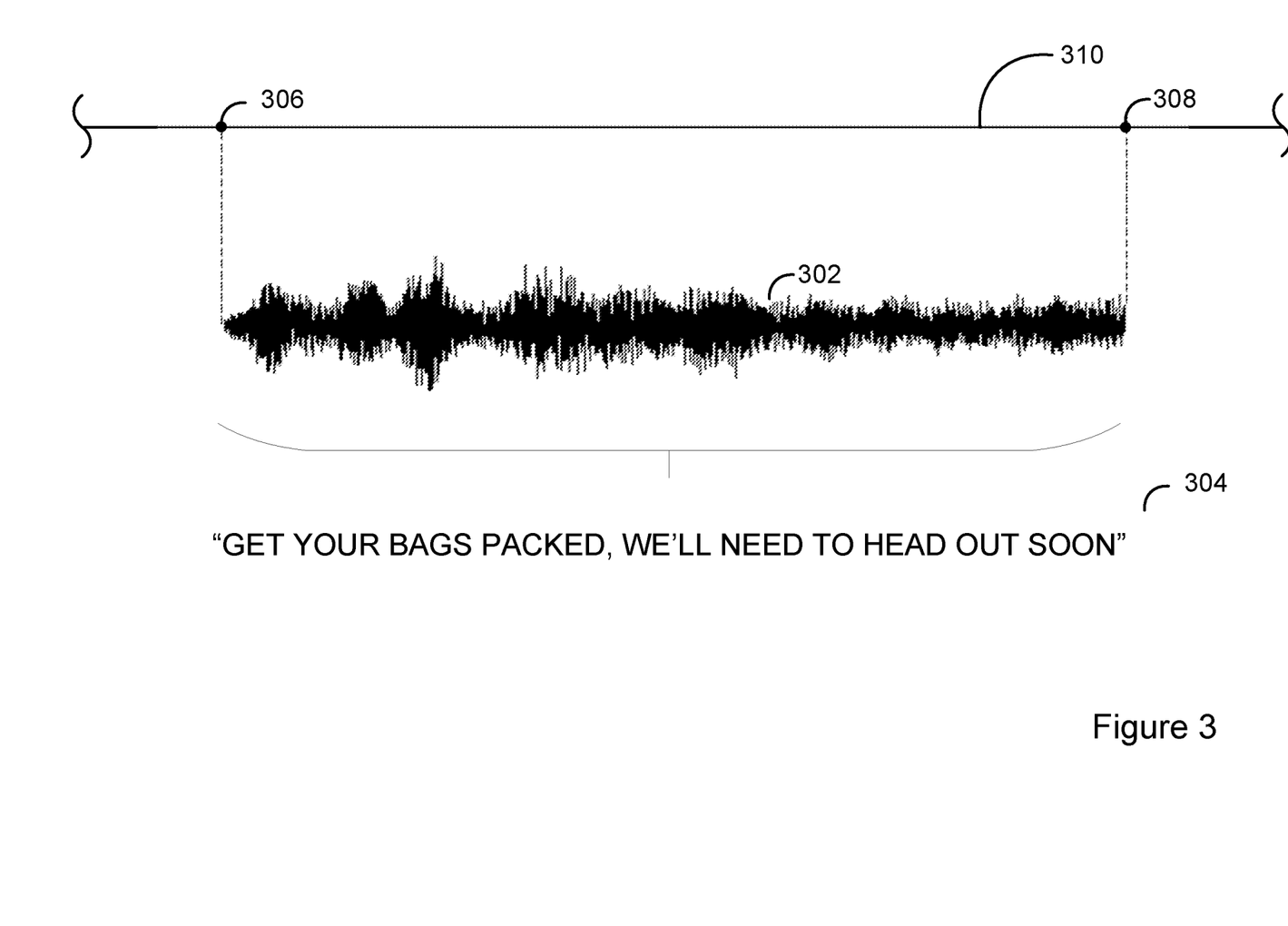
FIG. 3 is a simplified diagram of example audio representing speech and related concepts.

FIG. 3 illustrates an example of some of the above-described concepts. As shown, FIG. 3 depicts audio representing speech 302 and corresponding speech text 304. FIG. 3 further depicts a starting time point 306 and an ending time point 308, both on a timeline 310 associated with the audio representing speech, and therefore also with the obtained media.

The media manager 102 can then use at least the generated speech text and the determined starting and ending time points of the speech to (i) generate closed-captioning data that includes closed-captioning text based on the generated speech text and (ii) associate the generated closed-captioning text with the obtained media, such that the closed-captioning text is time-aligned with the video based on the determined starting and ending time points of the speech.

In some examples, the generated closed-captioning text can be the same as the generated speech text. However, in other situations, the media manager 102 can edit the generated speech text, thus generating different closed-captioning text. The media manager 102 can edit the text in various ways and for various reasons. For example, the media manager 102 can apply one or more text-editing rules that cause certain words (e.g., certain strong language, etc.) to be removed, replaced, etc., based on a given desired configuration.

The media manager 102 can associate the generated closed-captioning data with the obtained media in various ways, such as by generating closed-captioning metadata and associating that metadata with the obtained media (e.g., by storing the metadata in the obtained media, or by editing the obtained media or the metadata to refer to the other).

The media manager 102 can time align the generated closed-captioning text with the video (which the metadata can specify) in various ways. For example, the media manager 102 can time align the closed-captioning text with a portion of the video (e.g., with a given frame) that corresponds to the starting time point of the speech, the ending time point of the speech, or somewhere in between, for instance. In some cases, the media manager 102 can break up the closed-captioning text into multiple segments, and time align each segment with a respective portion of the video. For example, in the case where the closed-captioning text includes three sentences of text, the media manager 102 can break up the text into three different segments, one for each sentence, and time align each segment with a different portion of the video. More specifically, the media manager 102 could time align the first segment with a first frame corresponding to the starting time point of the speech, the media manager 102 could time align the second segment with a second frame corresponding to a time point halfway in between the starting and ending time points of the speech, and the media manager 102 could time align the third segment with a third frame corresponding to the ending time point of the speech. As another example, in the case where the closed-captioning text includes a sentence of text having eight words, the media manager 102 can break up the text into two different segments, each for a respective set of four words, and time align each segment with a different portion of the video. More specifically, the media manager 102 could time align a first segment (with the first four words) with a first frame corresponding to the starting time point of the speech and the media manager 102 could time align a second segment (with the last four words) with a second frame corresponding to a time point halfway in between the starting and ending time points of the speech. In other examples, the media manager 102 could break up the text into different portions and time align the portions in different ways, to suit a desired configuration. In practice, the media manager 102 could break up text and time align segments in much more intricate/complex ways, perhaps based on one or more predefined rules.

In some situations, the media manager 102 can take other information into account when time aligning the closed-captioning text. For example, the media manager 102 can consider the language of the speech/text (which may be selectable, e.g., by a user) and the nature of sentence construction in that language, such that the media manager 102 can ensure that segments of the closed-captioning text are associated with appropriate portions of the video. Among other things, this can help avoid a situation in which, due to the nature of sentence construction of a given language (which may change the order of nouns, verbs, etc. as compared to a translated version of the sentence being spoken/written in different language), the closed-captioning text potentially serves as a spoiler to the user, by providing a transcription of an notable portion of dialog before the corresponding potion of speech is spoken or the corresponding event in the video occurs.

In the case where the media manager 102 has identified a speaker of the audio representing speech, and thus a speaker associated with the speech text, the media manager 102 can further add the identity of the speaker to the closed-captioning data. In practice, the speakers could be identifies with generic names such as "Speaker 1," "Speaker 2," etc., but could be globally replaced with appropriate names (e.g., based on input provided by a user via a user-interface).

As noted above, in some cases, the media can also include audio representing sound effects (e.g., corresponding to events such as glass breaking, a gunshot, an explosion, a car crash, or a door slamming shut, among numerous other possibilities). In this case, the media manager 102 can use the audio representing sound effects to generate sound effect description text, which can alternatively or additionally used in connection with generating closed-captioning text to be included as part of the closed-captioning data. For example, in the case where the sound effect is one of glass breaking, the media manager 102 can generate sound effect description text such as "GLASS BREAKING SOUND", as one example.

To be able to use the audio representing speech for this purpose, the media manager 102 can first extract the audio representing sound effects. In some instances, the audio representing sound effects can be a separate audio track within the audio component, or it can be a portion of the audio component that is tagged such the audio representing sound effects can be isolated from any remaining audio included in the media. In other examples, the media manager 102 can isolate and/or extract the audio representing speech from other audio by employing any sound effects isolation and/or extraction technique now known or later discovered. The extracted audio can be stored in various ways (e.g., as audio data representing the audio, stored in an audio file format), as with any audio.

As noted above, the media manager 102 can use at least the audio representing sound effects as a basis to generate sound effects description text. The media manager 102 can do this in various ways. For example, the media manager 102 can do this by employing a machine learning technique, such as one that uses a deep neural network (DNN) to train a model to use a runtime input-data set that includes audio data for audio representing sound effects to generate a runtime output-data set that includes the corresponding sound effect description text (and perhaps corresponding starting and ending time points of the sound effect).

Notably though, before the media manager 102 uses a model to analyze a runtime input-data set to generate a runtime output-data set, the media manager 102 can first train the model by providing it with training input-data sets and training output-data sets. Each of the training input-data sets can include audio data for audio representing speech sound effects and each of the training output-data sets can include corresponding sound effect description text and corresponding starting and ending time points of the sound effect.

After the model is trained, the media manager 102 can then provide to the model runtime input data, which the model can use to generate runtime output data. Generally, the runtime input data is of the same type as the training input data as described above. As such, in one example, the media manager 102 using at least the audio representing speech as the basis to generate the speech text can involve: (i) providing to a trained model, at least audio data for the audio representing sound effects; and (ii) responsive to the providing, receiving from the trained model, generated sound effect descriptive text generated by the trained model and corresponding starting and ending time points of the sound effect.

Figure 4:
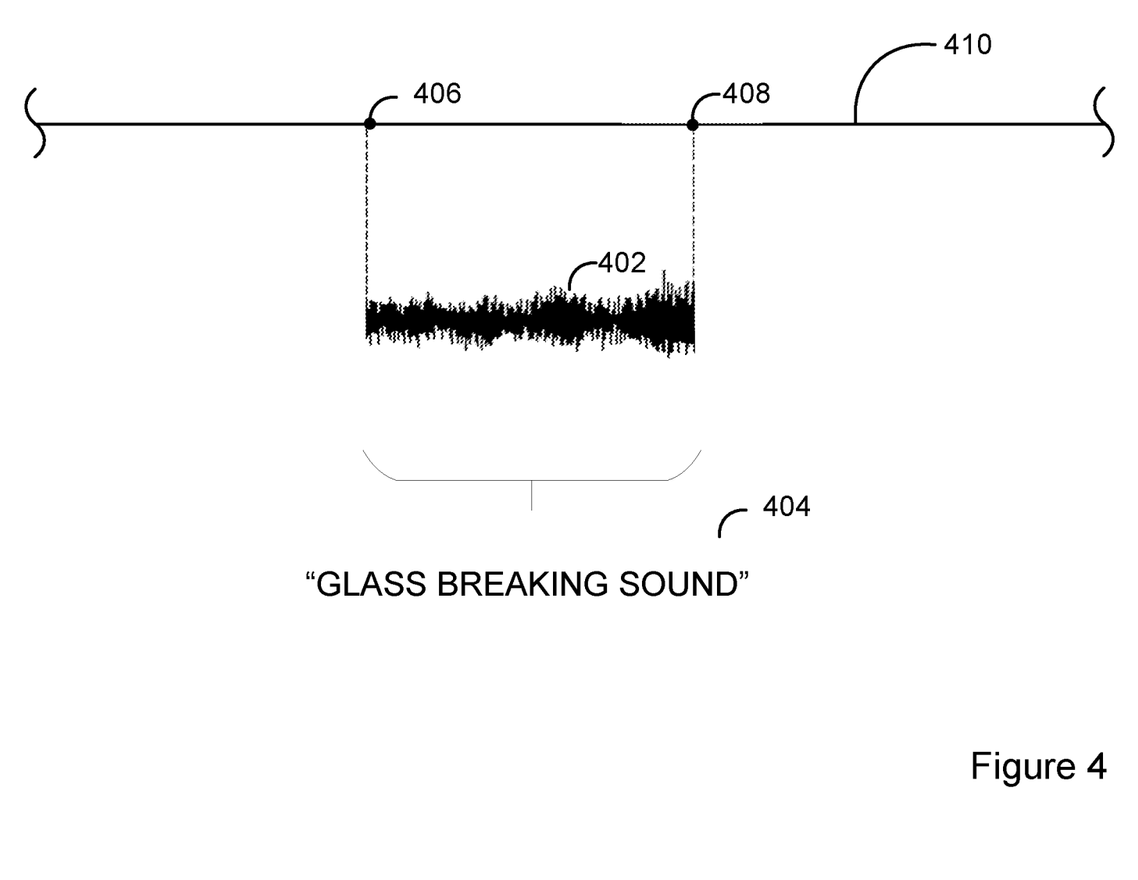
FIG. 4 is a simplified diagram of example audio representing sound effects and related concepts.

FIG. 4 illustrates an example of some of the above-described concepts. As shown, FIG. 4 depicts audio representing sound effects 402 and corresponding sound effect description text 404. FIG. 4 further depicts a starting time point 406 and an ending time point 408, both on a timeline 410 associated with the audio representing sound effects, and therefore also with the obtained media.

In addition to or instead of using at least the generated speech text and the determined starting and ending time points of the speech to (i) generate closed-captioning or subtitle data that includes closed-captioning text based on the generated speech text and (ii) associating the generated closed-captioning data with the obtained media, as described above, the media manager 102 can use at least the generated sound effect description text and the determined starting and ending time points of the sound effect to (i) generate closed-captioning data that includes closed-captioning text based on the generated sound effect descriptive text and to (ii) associate the generated closed-captioning data with the obtained media, in any of the ways as described above in connection with speech text.

Using the above-described techniques, the media manager 102 can use the obtained media to generate closed-captioning data for that obtained media, which can be stored as metadata in connection with the media (e.g., in the media database 104). As a result, the media manager 102 can cause the media-distribution system 106 to transmit to the media-presentation device 108, the obtained media and the generated closed-captioning data as metadata of the media. The media-presentation device 108 can then receive the transmitted media and closed-captioning data as metadata of the media, and present the received media with closed-captioning text overlaid thereon in accordance with the received closed-captioning data.

In some examples, some or all of the techniques above can also be applied in the context of generating subtitle data/text rather than closed-captioning data/text, though perhaps except for the operations related to sound effects, as subtitles generally are limited to covering speech. Also, since subtitle data is generally not associated with the media as metadata, but rather is associated with the media by way of modifying the media to include the subtitle text as an overlay, the act of associating the generated subtitle data with the obtained media could instead involve modifying the video of the obtained media by overlaying the subtitle text on the video (at appropriate temporal portions of the video based on time-aligned nature of the subtitle data).

Then, the media manager 102 can then cause the media-distribution system 106 to transmit to the media-presentation device 108, the modified media (with subtitle data embedded therein), and the media-presentation device 108 can receive and output for presentation the modified media that includes subtitle text in accordance with the subtitle data.

In some examples, rather than the media manager 102 generating closed-captioning or subtitle data and providing it to the media-presentation device 108 (as metadata or by way of modifying the media), in some examples, the media-presentation device 108 can generate and/or present closed-captioning data/text itself. With this approach, in one example, the media-presentation device 108 can include and make use of a delay buffer in the media processing pipeline, such that the media-presentation device 108 can process portions of the obtained media for the purpose of generating/presenting closed-captioning or subtitle text/data, before presenting the corresponding portion of the obtained media. This can allow the media-presentation device 108 to effectively "look ahead" and use portions of the obtained media that has not yet been presented, to facilitate performing one or more of the above described operations.

Notably, some or all the above described operations can be performed in connection with the entire amount of obtained media or a portion thereof. In some cases, the operations can be performed in connection with each of multiple different temporal portions of the obtained media.

B. Editing Closed-Captioning or Subtitle Data

In some examples, rather than being used to generate closed-captioning or subtitle data from scratch, the above-described techniques or variations thereof can be used to edit existing closed-captioning or subtitle data associated with the obtained media. As such, in one example situation, in the case where closed-captioning or subtitle data was manually generated and associated with the obtained media, the above-described techniques or variations thereof could be used to further refine the existing closed-captioning or subtitle data.

In the case of obtained media that is already associated with closed-captioning data, the media manager 102 can extract the existing closed-captioning data associated with the obtained media, generate closed-captioning data (e.g., using one or more of the techniques described above), compare the extracted closed-captioning data with the generated closed-captioning data, and based on the comparing, edit the existing closed-captioning data associated with the media. In this way, the media manager 102 can refine the existing closed-captioning data in view of the new closed-captioning data generated using by using one or more of the techniques described above.

The comparing and editing operations can involve various components of the respective closed-captioning data. For instance, these operations can relate to the speech text, the starting and ending time points of the speech, the speaker, the sound effect description text, or any other attribute or component of closed-captioning data. In some examples, the comparing and editing operations can involve comparing the extracted closed-captioning data with the generated closed-captioning data to identify discrepancies, and editing at least some portions of the closed-captioning data associated with the media to match the corresponding portion of the generated closed-captioning data.

In some cases, in the context of generating closed-captioning data using or more of the techniques described above, or a given portion of the closed-captioning data, the media manager can generate a confidence score (e.g., a score from 1-100 representing a level of confidence of the accuracy of the portion of generated closed-captioning data). Confidence scoring can be integrated at various phases of the closed-captioning data generation operations. For instance, in the case where a STT model uses speech to generate corresponding speech text, the model can be configured to output not only generated speech text, but also a confidence scope indicating a level of confidence of the accuracy of generated speech text. As a result, in connection with the media manager 102 identifying discrepancies as discussed above, the media manager 102 can identify just those discrepancies resulting from a mismatch of extracted closed-captioning data and generated closed-captioning data where the generated closed-captioning data has a threshold high confidence score. As a result, the media manager 102 can edit only certain portions of the extracted closed-captioning data, where it determines that the corresponding generated closed-captioning data is very likely to be accurate. In some examples, the media manager 102 can edit only certain portions of the extracted closed-captioning data based on other factors as well (e.g., based on an indication of significance of a given portion of the obtained media, based on an indication of whether the corresponding media was synthetically generated, etc.).

In some examples, some or all of the editing techniques described above can also be applied in the context of subtitle data/text rather than closed-captioning data/text, except perhaps for the operations related to sound effects, as subtitles generally are limited to covering speech. Notably though, since subtitle data is generally not associated with media as metadata, but rather is associated with the media by way of modifying the media to include the subtitle text as an overlay, the acts of extracted and editing the subtitle data may vary as compared to the act of extracting and editing the closed-captioning data.

In one example, the media manager 102 can extract subtitle data by employing any optical character recognition (OCR) techniques or the like now known or later discovered. For example, the media manager 102 can use a trained model that receives as input video data for the video that includes the embedded subtitle text, and then generates corresponding subtitle text and related timing information, to be able to facilitate extracting subtitle data from the video component of the obtained media.

Then, in connection with editing the subtitle text, the media manager 102 can any employ any inpainting techniques or the like now known or later discovered to "remove" the existing subtitle text, such that the media manager 102 can then modify the obtained media to include the subtitle text as an overlay, as described above in connection with generating subtitle data. In some example, to help maintain consistency, in connection with the media manager 102 extracting the subtitle data, such as by using OCR-related techniques or the like, the media manager 102 could also detect a subtitle text font style, color, or other presentation characteristic, which the media manager could then use as a presentation characteristic when overlaying the generated subtitle data.

C. Considerations When Outputting Closed-Captioning or Subtitle Data

The media-presentation device 108 can receive, process, and/or output closed-captioning data in various ways, including by using any related techniques now known or later discovered. In one example, the media-presentation device 108 can detect that a closed-captioning mode is enabled, and responsively extract closed-captioning data from the received media, and output for presentation closed-captioning text in a time-aligned manner in accordance with the closed-captioning data. In some cases, the closed-captioning data can include different closed-captioning data components, each associated with a different language. In this case, the media-presentation device 108 can select a closed-captioning data component associated with a particular language (e.g., based on a selection from a user), such that the media-presentation device 108 can output closed-captioning text in a target language.

In some examples, in connection with outputting the closed-captioning text, the media-presentation device 108 can output the text using a predefined font color, style, or other design aspects, and positioned within a predefined region of the video. For example, the media-presentation device 108 can output closed-captioning text in a white font having a black rectangular background, positioned near the lower center of the video. As another example, the media-presentation device 108 can scale down the content of the media, thus creating one or more "empty" regions (along the borders of the video) in which the closed-captioning text could be output.

As another approach, the media-presentation device 108 can use one or more design aspects and/or positions for the text, perhaps based on a selection from a user. For example, a user could adjust the design and/or position of the closed-captioning text by providing suitable input via a remote control device, among numerous other possibilities.

In other examples, in connection with outputting the closed-captioning text, the media-presentation device 108 can analyze the media content, and based on that analysis, can determine a position and/or design characteristic of the text such, such that the media-presentation device 108 can then output the text in accordance with the determined position or design characteristic. For example, for a given portion of text, the media-presentation device 108 can determine that the corresponding speech was spoken by a character associated with a given region within the video, and based on the determining, the media-presentation device 108 can then output the text in or near that region. In practice, this can result in character dialog being displayed near the character who uttering the corresponding speech (e.g., the text can be displayed within a speech bubble positioned near the character who uttered the speech).

In this context, the media-presentation device 108 can determine that the speech was spoken by a character associated with a given region within the video in various ways. For example, this can involve the media-presentation device 108 detecting lip movements that are time aligned (based on a given threshold/tolerance level) with the text, and then detecting a region of the lip movements (perhaps as an average/representative region over multiple frames).

Additionally or alternatively, this can involve the media-presentation device 108 detecting a face that is time aligned (based on a given threshold/tolerance level) with the text, and then detecting a region of the face (again, perhaps as an average/representative region over multiple frames). The media-presentation device 108 can use a lip movement detection and/or facial recognition model for this purpose, for example.

In another example, in addition to or as an alternative to outputting closed-captioning text near a region associated with a character who is uttering the corresponding speech, in some examples, based on the determining (that that is the case), the media-presentation device 108 could output the text in a given color, font size, or font style (or some other visual characteristic) that is associated with that character. In some examples, such a visual characteristic of text can be associated with a given character or object throughout a given portion or series of media content (e.g., for a given movie, episode, show series, etc.), such that text with that same visual characteristic can be used in connection with displaying text associated with some or all instances of that character or object being displayed.

In some cases, the media-presentation device 108 can additionally or alternatively detect a voice of the corresponding speech (e.g., by using a voice print model or the like) and associate the voice with a given character, such that the media-presentation device 108 can later use speech to identify/confirm a link between closed-captioning text and that character.

The media-presentation device 108 can also analyze the media content in other ways. For example, for a given portion of text, the media-presentation device 108 can identify instances and/or characteristics of regions of the video that might pose interference-related issues if closed-captioning data were to be output in that region. For example, the media-presentation device 108 could identify a region of the video that include subtitle text. The media-presentation device 108 could then use this information to facilitate outputting the closed-captioning text in a way that reduces or eliminates interference. For example, in the case where the media-presentation device 108 detects that the video includes subtitle text in a given region, the media-presentation device 108 could responsively cause the closed-captioning text to be output in a different region of the screen, so as to avoid jumbling the two together and potentially causing confusion for a user.

The media-presentation device 108 can analyze the media content in other ways still. For instance, for a given portion of text, the media-presentation device 108 can identify visual characteristics of one or more regions of the video, such as whether a given region has high contrast properties, whether the region includes certain colors, whether the region includes an object, a person's face, or a person, etc., as this can help inform the decision about where the media-presentation device 108 should output the closed-captioning text in a manner that is visually pleasing to a user (e.g., in a manner that avoids the closed-captioning text being overlaid on important parts of the video). In some examples, this technique can be combined with other techniques as described above. For example, in the case where the closed-captioning text is output near the person speaking (e.g., in a speech bubble), the media-presentation device 108 can analyze the scene to ensure that, while the closed-captioning text is output near the speaker, it still does not obstruct important parts of the video (e.g. the person in the video).

The media-presentation device 108 can analyze the media content in other ways still. For instance, for a given portion of closed-captioning text, the media-presentation device 108 could detect a characteristic of the corresponding speech and use that as a basis to vary the output the text. For example, based on the loudness of the speech, the media-presentation device could adjust the output of the text (e.g., by increasing the font size for louder speech).

In some examples, the media-presentation device 108 could also leverage another device (e.g., a "second screen" computing device such as a smart phone or tablet computer) that is viewable by a user of the media-presentation device 108, to output the closed-captioning text. With this arrangement, the media-presentation device 108 could extract the closed-captioning data and send it to the other device (e.g., over a local area network), thereby causing the other device to output the closed-captioning text in a time-aligned manner in accordance with the closed-captioning data.

In some instances, one or more of the above-described operations for outputting closed-captioning data can be performed in response to the occurrence of a trigger event. For example, one or more of these operations may be performed responsive to the media-presentation device 108 receiving a rewind command from a user via a user-interface. In practice, this could allow the media-presentation device 108 to cause closed-captioning data to be output, or to be output in a given way, in response to the user requesting that content be replayed (perhaps suggesting that the user did not comprehend what was occurring in the first instance of the media being presented.)

In at least some examples discussed above regarding the output of closed-captioning data/text, some or all of the techniques discussed can also be applied in the context of subtitle data/text rather than closed-captioning data/text, except perhaps for the operations related to sound effects, as subtitles generally are limited to covering speech. Notably though, since subtitle data is generally not associated with the media as metadata, but rather is associated with media by way of modifying the media to include the subtitle text as an overlay, the acts of outputting the text in a given region can may be replaced with acts of inpainting the subtitle text in its existing position, and then modifying the video to overlay the subtitle text in a different positon.

In some examples, the media-presentation device 108 can analyze the video as described above, such that the media-presentation device 108 can use that analysis to output the closed-captioning or subtitle text in accordance with the determined position or design characteristic. However, in other examples, the media manager 102 can perform such analysis and can modify the closed-captioning data to indicate information related to the analyzed media and/or the determined position or design characteristic. With this approach, the media-presentation device 108 can then extract and use this information as a basis to output the text in accordance with the determined position or design characteristic. And in the case of subtitle data, the media manager 102 can perform such analysis, such that it can modify the media to include subtitle text at the desired position at that time, before the modified media is transmitted to the media-presentation device 108.

As noted above, the media manager 102 can associate the generated closed-captioning text with the obtained media, such that the closed-captioning text is time aligned with the video, which can facilitate outputting the closed-captioning text with the video in a time-aligned manner. However, this associated closed-captioning text can also be used for other purposes as well. For example, it can be used to facilitate searching for a portion of the video (perhaps in the context of a user seeking to rewind, fast forward, or skip to a given segment of the video). In practice, the media manager 102 or the media-presentation device 108 could do this by presenting closed-captioning text to a user, allowing the user could to traverse or search through that text and made a selection of a given portion of the text, and then using that selection as a basis to rewind, fast forward, or seek to a portion of the video that corresponds to that selected text.

In connection with any of the above-described techniques that involve analyzing the video, in some cases, to help minimize the use of computing resources, it may be desirable to use an alternative version of the media for this purpose. For example, it might be desirable to use a lower-resolution version of the media, while using the higher resolution version for purposes of outputting the media for presentation.

D. Reporting and/or Editing System

In some instances, the media system 100 can include a reporting and/or editing system component that keeps records of the data and related operations discussed above, that generated related reports, and/or that allows a user to review, approve, reject, and/or edit various operations or results of operations. Among other things, could be used to generate various reports, such as reports showing what area-presentation data was obtained in connection with which portions of media programs, perhaps on a person-by-person, or on an aggregate-type basis. In addition, this system could provide for generating certain reports and/or as part of a quality assurance process.

E. Example Methods

Figure 5:
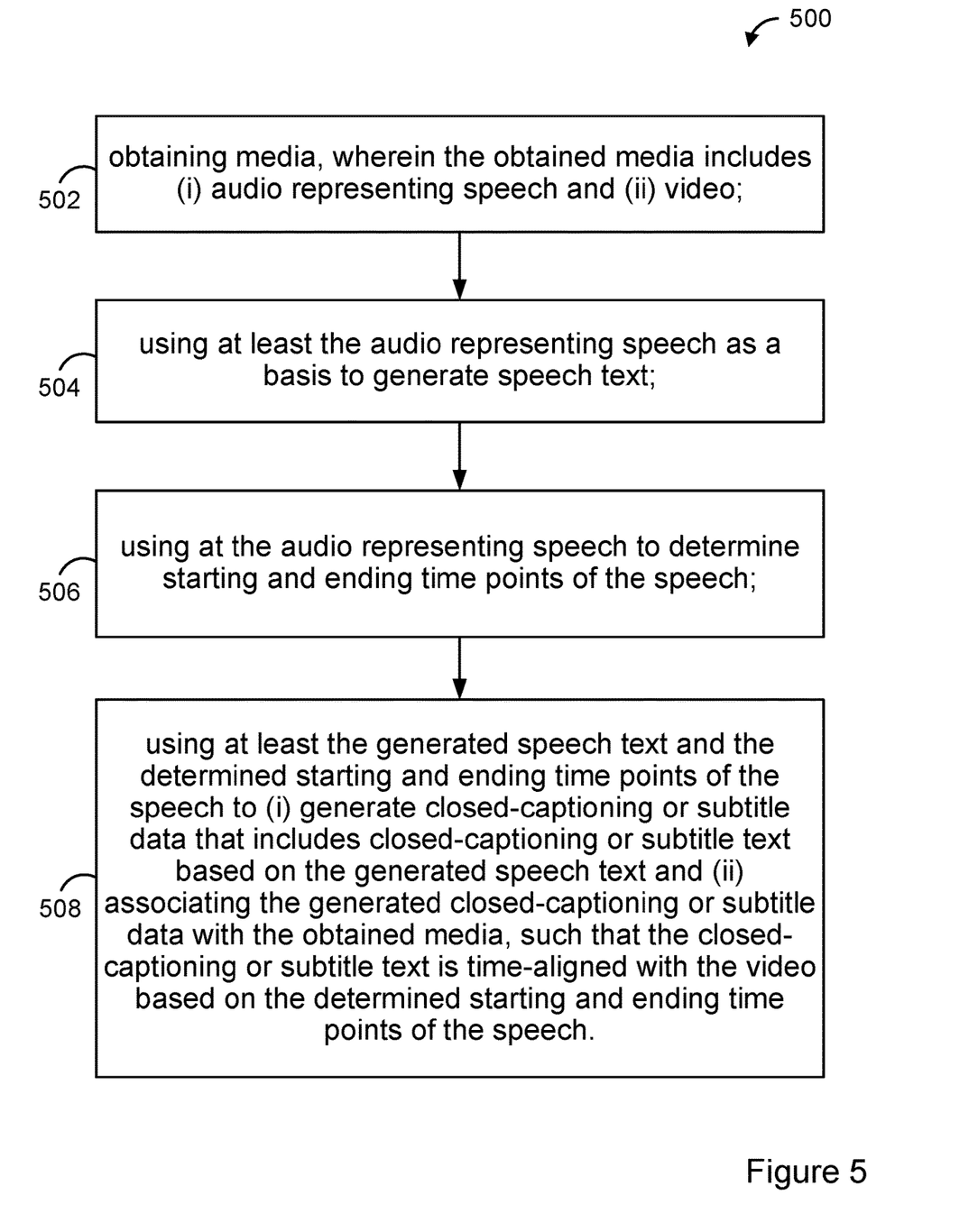
FIG. 5 is a flow chart of an example method.

FIG. 5 is a flow chart illustrating an example method 500. The method 500 can be carried out by a media system, such as the media system 100, the media manager 102, the media-presentation device 108, or more generally, by a computing system, such as the computing system 200. At block 502, the method 500 includes obtaining media, wherein the obtained media includes (a) audio representing speech and (b) video. At block 504, the method 500 includes using at least the audio representing speech as a basis to generate speech text. At block 506, the method 500 includes using at least the audio representing speech as a basis to determine starting and ending time points of the speech. At block 508, the method 500 includes using at least the generated speech text and the determined starting and ending time points of the speech to (a) generate closed-captioning or subtitle data that includes closed-captioning or subtitle text based on the generated speech text and (b) associating the generated closed-captioning or subtitle data with the obtained media, such that the closed-captioning or subtitle text is time-aligned with the video based on the determined starting and ending time points of the speech.

Figure 6:
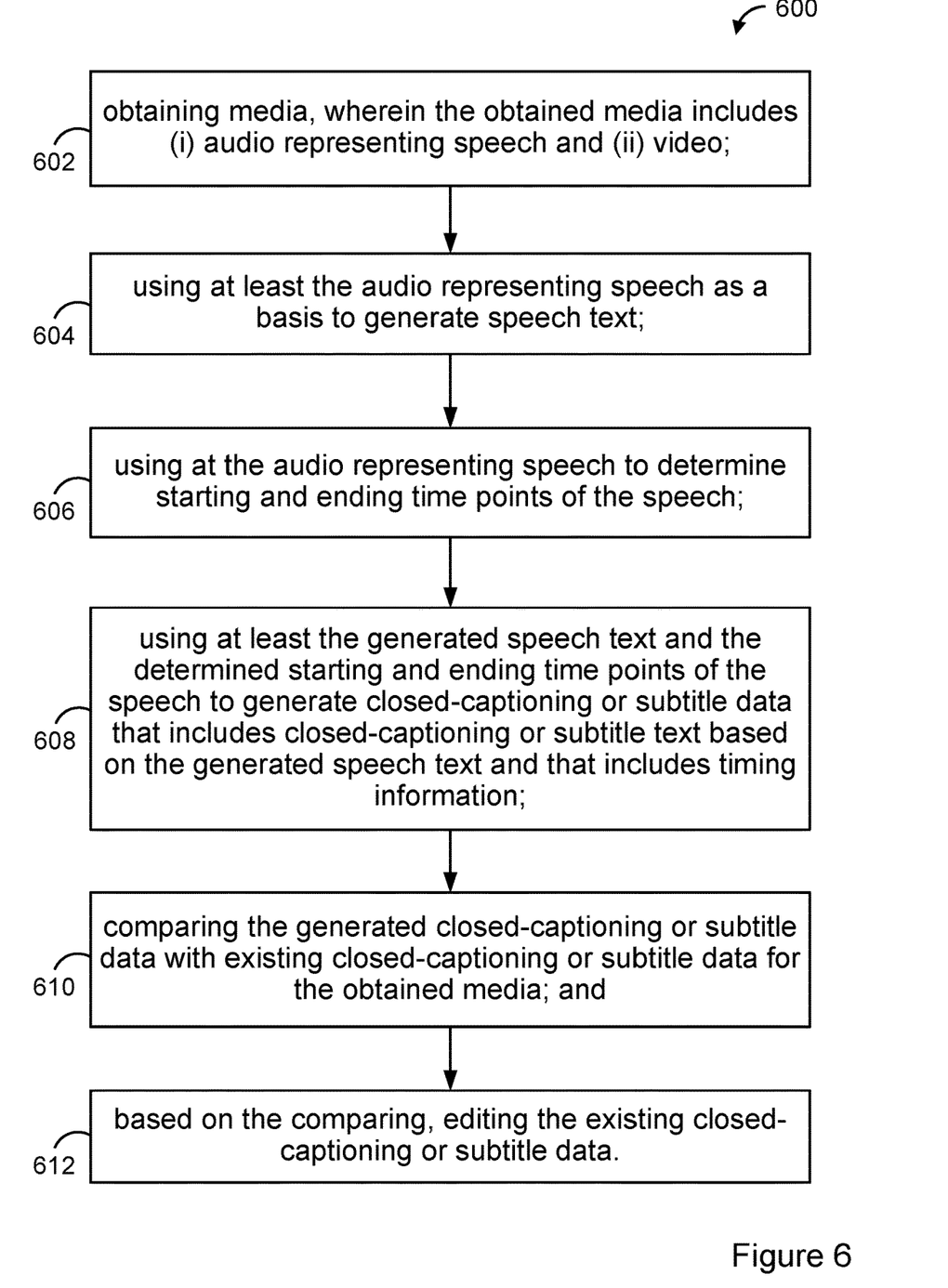
FIG. 6 is a flow chart of another example method.

FIG. 6 is a flow chart illustrating an example method 600. The method 600 can be carried out by a media system, such as the media system 100, the media manager 102, the media-presentation device 108, or more generally, by a computing system, such as the computing system 200. At block 602, the method 600 includes obtaining media, wherein the obtained media includes (i) audio representing speech and (ii) video. At block 604, the method 600 includes using at least the audio representing speech as a basis to generate speech text. At block 606, the method 600 includes using at least the audio representing speech to determine starting and ending time points of the speech. At block 608, the method 600 includes using at least the generated speech text and the determined starting and ending time points of the speech to generate closed-captioning or subtitle data that includes closed-captioning or subtitle text based on the generated speech text and that includes timing information. At block 610, the method 600 includes comparing the generated closed-captioning or subtitle data with existing closed-captioning or subtitle data for the obtained media. At block 612, the method 600 includes based on the comparing, editing the existing closed-captioning or subtitle data.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    obtaining media, wherein the obtained media includes (i) audio representing speech, (ii) video, and (iii) metadata associated with the obtained media;
    using at least the audio representing speech as a basis to generate speech text, wherein using at least the audio representing speech as the basis to generate the speech text comprises:
        (i) providing to a trained model, at least audio data for the audio representing speech and the metadata associated with the obtained media, wherein the metadata associated with the obtained media includes a rating of the obtained media; and
        (ii) responsive to the providing, receiving from the trained model, generated speech text generated by the trained model;
    using at least the audio representing speech as a basis to determine starting and ending time points of the speech; and using at least the generated speech text and the determined starting and ending time points of the speech to (i) generate closed-captioning or subtitle data that includes closed-captioning or subtitle text based on the generated speech text and (ii) associating the generated closed-captioning or subtitle data with the obtained media, such that the closed-captioning or subtitle text is time-aligned with the video based on the determined starting and ending time points of the speech.

2. The method of claim 1, further comprising:
extracting from the obtained media, the audio representing speech, wherein using the audio representing speech as the basis to generate the speech text comprises using the extracted audio representing speech as the basis to generate the speech text.

3. The method of claim 1, wherein using at least the audio representing speech as the basis to generate the speech text comprises:
using at least (i) the audio representing speech and (ii) mouth movement depictions of the video, as the basis to generate the speech text.

4. The method of claim 1, wherein using at least the audio representing speech to determine starting and ending time points of the speech comprises:
providing to a trained model, at least audio data for the audio representing speech; and
responsive to the providing, receiving from the trained model, starting and ending time points determined by the trained model.

5. The method of claim 1, wherein the obtained media further includes audio representing a sound effect, and wherein the method further comprises:
using at least the audio representing the sound effect as a basis to generate sound effect description text.

6. The method of claim 5, wherein using at least the audio representing the sound effect as the basis to generate the sound effect description text comprises:
providing to a trained model, at least audio data for the audio representing the sound effect; and
responsive to the providing, receiving from the trained model, sound effect description text generated by the trained model.

7. The method of claim 1, wherein the generated closed-captioning or subtitle data is generated closed-captioning data, and wherein associating the generated closed-captioning data with the obtained media comprises:
storing the generated closed-captioning data as metadata associated with the obtained media.

8. The method of claim 7, further comprising:
transmitting to a media-presentation device, the obtained media and the generated closed-captioning data as metadata of the media, wherein the media-presentation device is configured to (i) receive the transmitted media and closed-captioning data as metadata of the media, and (ii) present the received media with closed-captioning text overlaid thereon in accordance with the received closed-captioning data.

9. The method of claim 1, wherein the generated closed-captioning or subtitle data is generated subtitle data, and wherein associating the generated subtitle data with the obtained media comprises:
modifying the obtained media by overlaying on it subtitle text in accordance with the subtitle data.

10. The method of claim 9, further comprising:
transmitting to a media-presentation device, the modified media, wherein the media-presentation device is configured to receive and output for presentation the modified media.

11. The method of claim 1, wherein the generated closed-captioning or subtitle data is generated closed-captioning data, and wherein the method further comprises:
outputting for presentation, by a media presentation device, media with closed-captioning text overlaid thereon in accordance with the closed-captioning data.

12. The method of claim 1, wherein the generated closed-captioning or subtitle data is generated subtitle data, and wherein the method further comprises:
outputting for presentation, by a media presentation device, media modified to include subtitle text in accordance with the subtitle data.

13. The method of claim 1, further comprising:
determining that the speech was spoken by a character associated with a given region within the video; and
based on the determining, outputting the speech text in or near that given region.

14. The method of claim 1, further comprising:
determining that the speech was spoken by a given character; and
based on the determining, outputting the speech text in a font color associated with the given character.

15. A computing system comprising a processor and a non-transitory computer-readable storage medium having stored thereon program instructions that upon execution by the processor, cause the computing system to perform a set of acts comprising:
obtaining media, wherein the obtained media includes (i) audio representing speech, (ii) video, and (iii) metadata associated with the obtained media;
using at least the audio representing speech as a basis to generate speech text, wherein using at least the audio representing speech as the basis to generate the speech text comprises:
(i) providing to a trained model, at least audio data for the audio representing speech and the metadata associated with the obtained media, wherein the metadata associated with the obtained media includes a rating of the obtained media; and
(ii) responsive to the providing, receiving from the trained model, generated speech text generated by the trained model;
using at least the audio representing speech to determine starting and ending time points of the speech; and
using at least the generated speech text and the determined starting and ending time points of the speech to (i) generate closed-captioning or subtitle data that includes closed-captioning or subtitle text based on the generated speech text and (ii) associating the generated closed-captioning or subtitle data with the obtained media, such that the closed-captioning or subtitle text is time-aligned with the video based on the determined starting and ending time points of the speech.

16. The computing system of claim 15, wherein the generated closed-captioning or subtitle data is generated closed-captioning data, and wherein associating the generated closed-captioning data with the obtained media comprises:
storing the generated closed-captioning data as metadata associated with the obtained media.

17. A non-transitory computer-readable storage medium having stored thereon program instructions that upon execution by a processor, cause a computing system to perform a set of acts comprising:
- obtaining media, wherein the obtained media includes (i) audio representing speech, (ii) video, and (iii) metadata associated with the obtained media;
- using at least the audio representing speech as a basis to generate speech text, wherein using at least the audio representing speech as the basis to generate the speech text comprises:
    - (i) providing to a trained model, at least audio data for the audio representing speech and metadata associated with the obtained media, wherein the metadata associated with the obtained media includes a rating of the obtained media; and
    - (ii) responsive to the providing, receiving from the trained model, generated speech text generated by the trained model;
- using at least the audio representing speech to determine starting and ending time points of the speech; and
- using at least the generated speech text and the determined starting and ending time points of the speech to (i) generate closed-captioning or subtitle data that includes closed-captioning or subtitle text based on the generated speech text and (ii) associating the generated closed-captioning or subtitle data with the obtained media, such that the closed-captioning or subtitle text is time-aligned with the video based on the determined starting and ending time points of the speech.

* * * * *